(12) United States Patent
Lin et al.

(10) Patent No.: US 9,330,110 B2
(45) Date of Patent: May 3, 2016

(54) IMAGE SEARCH SYSTEM AND METHOD FOR PERSONALIZED PHOTO APPLICATIONS USING SEMANTIC NETWORKS

(71) Applicant: Xerox Corporation, Norwalk, CT (US)

(72) Inventors: Julianna Elizabeth Lin, Campbell, CA (US); Luca Marchesotti, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 255 days.

(21) Appl. No.: 13/944,023

(22) Filed: Jul. 17, 2013

(65) Prior Publication Data

US 2015/0026101 A1    Jan. 22, 2015

(51) Int. Cl.
| | | |
|---|---|---|
| G06F 15/18 | (2006.01) | |
| G06F 17/30 | (2006.01) | |
| G06N 5/02 | (2006.01) | |
| G06N 99/00 | (2010.01) | |

(52) U.S. Cl.
CPC .......... *G06F 17/30247* (2013.01); *G06N 5/025* (2013.01); *G06N 99/005* (2013.01)

(58) Field of Classification Search
None
See application file for complete search history.

(56) References Cited

U.S. PATENT DOCUMENTS

| | | | |
|---|---|---|---|
| 6,243,713 B1 * | 6/2001 | Nelson et al. | |
| 7,756,341 B2 | 7/2010 | Perronnin | |
| 8,111,923 B2 | 2/2012 | Csurka et al. | |
| 2002/0159641 A1 * | 10/2002 | Whitney et al. | 382/219 |
| 2004/0267740 A1 * | 12/2004 | Liu et al. | 707/3 |
| 2011/0085739 A1 | 4/2011 | Zhang et al. | |
| 2012/0294514 A1 | 11/2012 | Saunders et al. | |

OTHER PUBLICATIONS

Li, Li-Jia et al "Towards Total Scene Understanding: Classifiaction, Annotation and Segmentaiton in an Automatic Framework" IEEE 2009 [ONLINE] Downloaded Jun. 15, 2015 http://ieeexplore.ieee.org/stamp/stamp.jsp?tp=&arnumber=5206718.*

Good, Benjamin. "Strategies for Amassing, Characterizing, and Applying Third-Party Metadata in Bioinformatics" 2009 [ONLINE] Downloaded Dec. 21, 2015 http://citeseerx.ist.psu.edu/viewdoc/download?doi=10.1.1.477.819&rep=rep1&type=pdf.*

Li, Beaito, Kingshy Goh, and Edward Chang. "Confidence-Based Dynamic Ensemble for Image Anntoation and Semantics Discovery" 2003 [ONLINE] Downloaded Dec. 21, 2015 http://delivery.acm.org/10.1145/960000/957051/p195-li.pdf?ip=151.207.250.71&id=957051&acc=ACTIVE%20SERVICE&key=C15944E53D0ACA63%2E4D4702B0C3E38B35%2E4D4702B0C3E38B35%2E4D4702B0C3E38B35&CFID=.*

(Continued)

*Primary Examiner* — Ben Rifkin
(74) *Attorney, Agent, or Firm* — Fay Sharpe LLP (57) ABSTRACT

A system and method for searching a finite collection of images using at least one semantic network. Upon receipt of a query from a user that includes a theme and one or more initial keywords, a set of keywords based on the theme and including the initial keywords is generated from one or more semantic networks corresponding to the theme and/or initial keywords. When the finite collection of images includes suitable metadata, a result set is generated of images corresponding to the expanded set of keywords. When the finite collection includes images lacking in metadata, a remote third-party image collection is searched with the set of keywords to obtain a result set that is used to train visual classifiers as to visual concepts associated with the keywords. The classifiers are used to classify the images in the finite collection lacking metadata and the search of the finite collection is performed with the set of keywords to generate a result set.

16 Claims, 8 Drawing Sheets

(56) References Cited

OTHER PUBLICATIONS

J. Deng, A. Berg, K. Li and L. Fei-Fei, "What Does Classifying More Than 10,000 Image Categories Tell Us?" Proceedings of the 12th European Conference of Computer Vision (ECCV). 2010, pp. 71-84.

George A. Miller et al. "Introduction to WordNet: An on-line lexical database*."International journal of lexicography 3.4 (1990), pp. 235-244.

G. Csurka, C. Dance, L. Fan, J. Willamowski, and C. Bray. "Visual Categorization With Bags of Keypoints". In Workshop on statistical learning in computer vision, ECCV, vol. 1, p. 22, 2004.

P. Gulati and A. K. Sharma, "Ontology Driven Query Expansion for Better Image Retrieval". International Journal of Computer Applications (0975-8887), vol. 5—No. 10, Aug. 2010, pp. 33-37.

* cited by examiner

IMAGE SEARCH SYSTEM AND METHOD FOR PERSONALIZED PHOTO APPLICATIONS USING SEMANTIC NETWORKS

BACKGROUND

The subject disclosure is directed to the imaging arts, digital photography arts, workflow arts, database arts, electronic storage arts, semantic network arts, and the like.

A personalized print artifact is generally a user-created document incorporating one or more photographs or images, such as a wedding album, photo-calendar, holiday card, party poster, thank you card, or the like. When creating such personalized print artifacts, the user must search through their personal collection(s) of photographs to locate the best match to the theme of their printed item, e.g., fall, Wedding, baseball, soccer, dance, school, Halloween, Christmas, Easter, Mother's Day, Father's Day, etc. However, most users have a limited set of personal photos with which to work, i.e., they are unlikely to have high-quality photographs of every single keyword (e.g., bat, ball, flowers, wedding, goal, ghost, witch, leaves, costumes, etc.) related to a particular theme.

Currently, a user utilizes the following workflow to search for a specific image (or set of images) to match a desired theme (e.g., October). First, the user provides the system with a photo-collection P, the desired theme T, and an initial set of search words, $W_0$. The system then searches through the photo-collection for images R that "match" the initial search criteria (for example, by searching the images' metadata for the desired keywords), and then displays these results to the user. The user then evaluates the results, and determines if a suitable match has been found. If no match is found, then the user must select a new set of search words and start the process over again.

The above-described workflow uses pre-existing metadata to identify the content of the image; more specifically, it uses metadata that has been pre-generated using any number of methods, such as manual tagging, crowd sourcing using a photo-sharing website, face recognition algorithms, EXIF geo-location data, etc. A variation on this workflow uses advanced image processing techniques, such as Xerox's Generic Visual Categorizer in U.S. Pat. No. 7,756,341 (the entirety of which is incorporated by reference herein) to look for additional matches to the user-supplied keywords. Such advanced techniques can be used to analyze and index the user's photo-collection automatically. In this way, users do not need to manually tag every single photo in their photo-collection.

Despite this improvement, a common problem of both avenues is that their success relies heavily on the proper choice of the initial search words. For example, the simple search technique described above will be unsuccessful if none of the images contain the initial search words as part of the keywords in their meta-data. Similarly, the more advanced search technique will fail if none of the images are immediately recognizable as the object or person (or place, or thing) described by the initial search words.

Thus, it would be advantageous to provide an efficient system and method for identifying appropriate keywords related to a theme T and using such keywords to locate the most relevant images for the theme.

INCORPORATION BY REFERENCE

The following references, the disclosures of which are incorporated herein by reference, in their entirety, are mentioned.

U.S. Pat. No. 7,756,341 to Florent Perronnin, issued on Jul. 13, 2010 and entitled GENERIC VISUAL CATEGORIZATION METHOD AND SYSTEM.

U.S. Pat. No. 8,111,923 to Csurka et al., issued on Feb. 7, 2012 and entitled SYSTEM AND METHOD FOR OBJECT CLASS LOCALIZATION AND SEMANTIC CLASS BASED IMAGE SEGMENTATION.

U.S. Patent Application Publication No. 2011/0085739 to Dong-Qing Zhang et al., published on Apr. 14, 2011 and entitled SYSTEM AND METHOD FOR SIMILARITY SEARCH OF IMAGES.

U.S. Patent Application Publication No. 2012/0294514 to Saunders et al., published on Nov. 22, 2012 and entitled TECHNIQUES TO ENABLE AUTOMATED WORKFLOWS FOR THE CREATION OF USER-CUSTOMIZED PHOTOBOOKS.

GEORGE A. MILLER ET AL. "Introduction to WordNet: An on-line lexical database*." International journal of lexicography 3.4 (1990), pages 235-244.

J. DENG, A. BERG, K. LI and L. FEI-FEI, "What Does Classifying More Than 10,000 Image Categories Tell Us?" Proceedings of the 12th European Conference of Computer Vision (ECCV). 2010, pages 71-84.

G. CSURKA, C. DANCE, L. FAN, J. WILLAMOWSKI, and C. BRAY. "Visual Categorization With Bags Of Keypoints". In Workshop on statistical learning in computer vision, ECCV, volume 1, page 22, 2004.

P. GULATI and A. K. SHARMA, "Ontology Driven Query Expansion for Better Image Retrieval". International Journal of Computer Applications (0975-8887), Volume 5-No. 10, August 2010, pages 33-37.

BRIEF DESCRIPTION

In one aspect of the exemplary embodiment, a method for searching a finite collection of images using at least one semantic network is provided. The method includes receiving a query from an associated user, the query comprising a theme. The method further includes identifying a set of keywords associated with the theme, each of the set of keywords being linked to the theme via the at least one semantic network. In addition, the method includes searching the finite collection of images with the identified set of keywords. The method further includes retrieving a result set of images corresponding to the theme from the finite collection of images responsive to a result of the searching thereof. The method also includes that at least one of the receiving, identifying, searching, and retrieving is performed by a computer processor.

In another aspect, a system for searching a finite collection of images using at least one semantic network is provided. The system includes a keyword identifier component configured to identify a set of keywords associated with a theme using the at least one semantic network, and a classification component configured to classify each image in the finite collection of images according to a visual concept. The system further includes memory which stores instructions for retrieving, from a remote collection of images, at least one image corresponding to each of the set of keywords, and training a plurality of classifiers for the classification component, each of the plurality of classifiers corresponding to a visual concept associated with at least one of the images retrieved from the remote collection. The memory further stores instructions for classifying each image in the finite collection of images in accordance with a selected set of classifiers, and searching the finite collection of classified images in accordance with the identified set of keywords. In addition, the memory includes instructions for retrieving a result set of images corresponding to the theme and the set of keywords from the finite collection of images responsive to a result of the searching thereof. The system also includes a processor that is in communication with the memory and which executes the instructions.

In another aspect, a computer-implemented method for searching a finite collection of images using at least one semantic network is provided. The method includes receiving, by a computer system having a processor, a query from an associated user, the query including a theme and at least one initial keyword. The method also includes identifying a set of keywords associated with the received theme and at least one initial keyword using at least one semantic network associated with the received theme and the at least one initial keyword. In addition, the method includes retrieving a set of images from a remote data storage having metadata including at least one of the set of semantically linked keywords, and training a plurality of visual classifiers to learn a set of visual concepts corresponding to the retrieved set of images. The method further includes classifying each of a plurality of images of the finite collection of images in accordance with the trained visual classifiers. Additionally, the method includes generating a result set of images from the finite collection of classified images in response to a search thereof with the set of keywords.

DETAILED DESCRIPTION

One or more embodiments will now be described with reference to the attached drawings, wherein like reference numerals are used to refer to like elements throughout.

In accordance with one aspect, a system and method are provided for an intelligent search engine that uses semantic networks to automatically expand the initial list of search words proposed by a user as needed. Thus, instead of requiring the user to re-enter new search words each time, the systems and methods are capable of automatically selecting additional keywords and additional images for the user to consider, as the system already knows which keywords are thematically and semantically related to the user's initial search words. Accordingly, the systems and methods set forth herein provide for a result set of images that include a greater number of relevant images relating to a searched theme.

In such an aspect, a system and method are provided for searching through a large, but finite, collection of images and automatically identifying images that are related to a broader theme, such as "winter", "sports", "October", "picnic", etc. More specifically, the subject systems and methods work by using semantic networks (i.e. a network of concepts and their inter-relationships) to expand the scope of a typical keyword search to include additional keywords that are known to be semantically related to the desired theme. For example, a theme of "October", with an initial keyword of "pumpkin", could be expanded to include other examples of October's fall produce (e.g., "apples", "butternut squash", etc.), or other examples of Halloween (an October holiday), such as "witches", "ghosts", "children in costume", etc. In this way, when a photo-collection contains few examples of the original keyword (e.g., pumpkin), the system can automatically suggest additional photos that are semantically related (and thus relevant) to the original keyword.

In another aspect of the exemplary embodiment, the images may have pre-generated metadata information in the form of subject keywords, which were selected using manual tagging, crowd sourcing, automatic image categorization techniques, and/or the like. In another aspect, the images do not require pre-generated metadata information, because specialized image recognition and image categorization technology (as discussed below) are used to automatically match images to targeted subject keywords; where these keywords were either supplied by the user directly, or generated automatically using the system's prior knowledge of the user's intent (i.e., the theme chosen by the user, and the initial keywords supplied by the user), or a combination of both methods.

In another aspect, an image categorization algorithm can be run on-demand for a given set of user-supplied keywords, enabling the system and method set forth herein to adapt to new keywords provided by the user. For example if the user provides a keyword that the system does not immediately recognize (i.e., it does not already have a pre-calculated value or image signature or other identifier associated with this keyword), then the system could retrieve sample images of the keyword from public sources (such as Flickr, a common photo-sharing web service), and use this to generate the appropriate image identifiers, which can then be used to re-categorize the user's photo-collection, on-the-fly, and according to the new keywords of interest.

Figure 1:
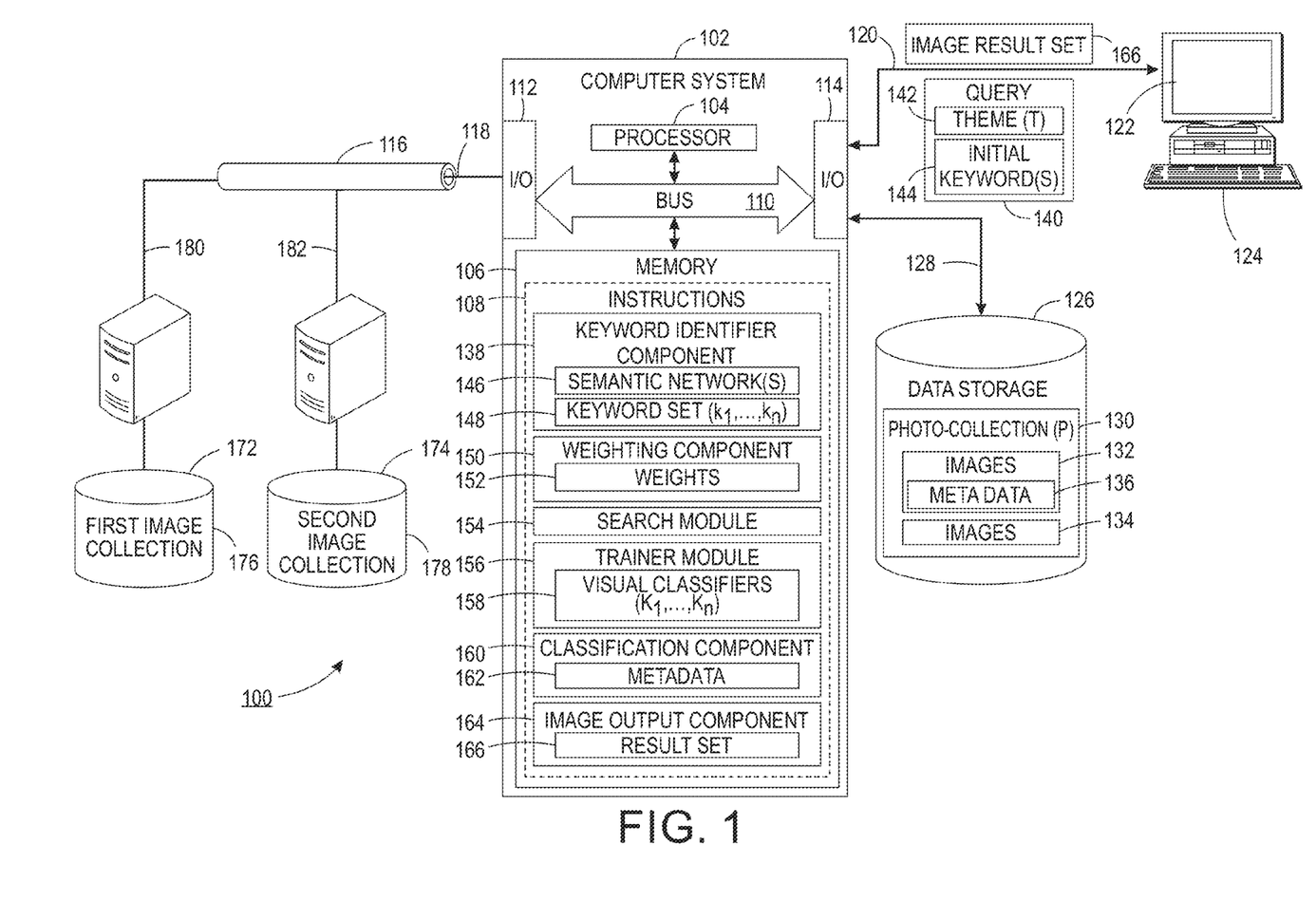
FIG. 1 is diagram of system for searching a finite collection of images using at least one semantic network in accordance with one aspect of the exemplary embodiment.

Referring now to FIG. 1, there is shown a functional block diagram of a system 100 for searching a finite collection of images using at least one semantic network in accordance with one aspect of the subject disclosure. It will be appreciated that the various components depicted in FIG. 1 are for purposes of illustrating aspects of the exemplary embodiment, and that other similar components, implemented via hardware, software, or a combination thereof, are capable of being substituted therein.

As shown in FIG. 1, the searching system 100 includes a computer system represented generally at 102, which is capable of implementing the exemplary method described below. It will be appreciated that while shown with respect to the computer system 102, any suitable computing platform may be utilized in accordance with the systems and methods set forth herein. The exemplary computer system 102 includes a processor 104, which performs the exemplary method by execution of processing instructions 108 which are stored in memory 106 connected to the processor 104, as well as controlling the overall operation of the computer system 102.

It will be appreciated that while illustrated in FIG. 1 as implemented in image searching, the systems and methods set forth hereinafter are equally adaptable and contemplated to extend to any suitable data processing, searching, or data storage system. For example, document management systems may utilize the systems and methods discussed herein to identify documents responsive to a search, a web-based search engine may utilize the systems and methods to perform advanced web-searches, a database may utilize the systems and methods set forth herein to refine and expand upon queries submitted by a user, and the like. Accordingly, it will be appreciated that myriad other environments are capable of utilizing the systems and methods now set forth.

The computer system 102 may include one or more input/output (I/O) interface devices 112 and 114 for communicating with external devices. The I/O interface 114 may communicate, via communications link 120, with one or more of a display device 122, for displaying information such as returned images, search results, queries, and the like, and a user input device 124, such as a keyboard or touch or writable screen, for inputting text, and/or a cursor control device, such as a mouse, trackball, or the like, for communicating user input information and command selections to the processor 104.

The various components of the computer system 102 associated with the system 100 may all be connected by a data/control bus 110. The processor 104 of the computer system 102 is in communication with associated data storage device 126 via a communications link 128. A suitable communications link 128 may include, for example, the public-switched telephone network, a proprietary communications network, infrared, optical, or other suitable wired or wireless data communications channel. The data storage device 126 is capable of implementation on components of the computer system 102, e.g., stored in local memory 106, i.e., on hard drives, virtual drives, or the like, or on remote memory accessible to the computer system 102.

The associated data storage device 126 corresponds to any organized collection of data used for one or more purposes. Implementation of the associated data storage device 126 is capable of occurring on any mass storage device(s), for example, magnetic storage drives, a hard disk drive, optical storage devices, flash memory devices, or a suitable combination thereof. As illustrated in FIG. 1, the data storage device 126 may include a finite collection of images, depicted as the photo-collection (P) 130, comprising a plurality of digital photographs/images/files, depicted as images 132 with metadata 136 and images 134 without metadata. It will be appreciated that the metadata 136 associated with the images 132 may include a name, description, feature vector, or other descriptor associated with the image 132. The images 134 without metadata may be recently acquired digital photographs, or the like, which have no associated name/description, etc., corresponding thereto. It will further be appreciated that the digital images 132-134 may be in any suitable format, e.g., JPEG, TIFF, PNG, GIF, RAW, a proprietary image format, or the like. It will also be appreciated that while illustrated in FIG. 1 as containing images 132-134, the systems and methods disclosed herein are adaptable to other types of digital files, e.g., documents, PDF, spreadsheets, webpages, or the like.

Figure 2:
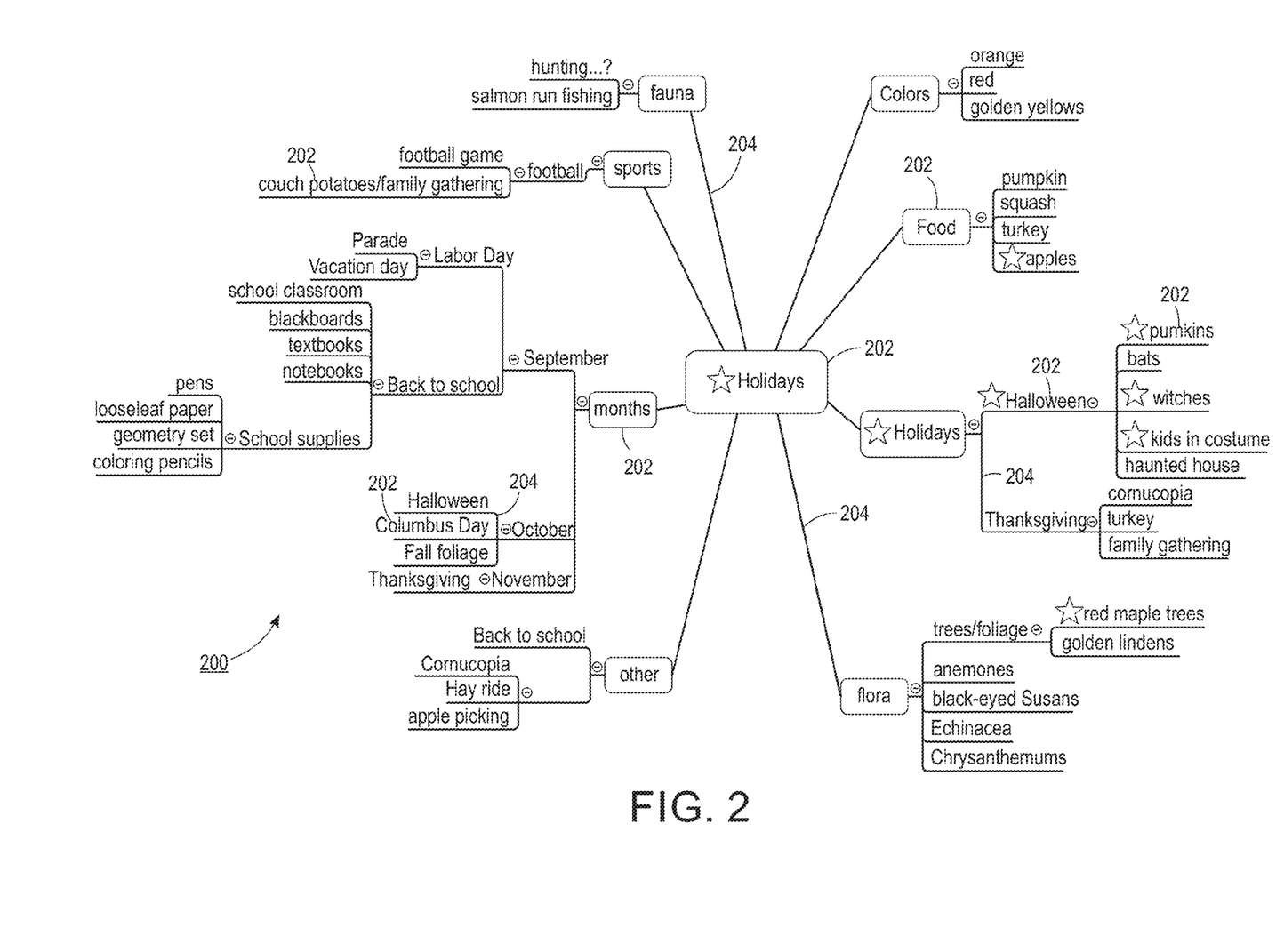
FIG. 2 provides illustration of an example semantic network according to one aspect of the exemplary embodiment.

The instructions 108 include a keyword identifier component 138 configured to receive query 140 from an associated user via the user interface device 124 and identify a set of keywords $(k_1, \ldots, k_n)$ 148 semantically or thematically related thereto via one or more semantic networks 146. An example of a semantic network 146 is shown at 200 in FIG. 2, discussed below. The query 140 includes a theme (T) 142 corresponding to the theme of an image or file for which the user is searching. A theme (T) may correspond, for example, to a season, holiday, concept, occasion, event, month, date, or the like. Examples of such themes (T) are illustrated in FIG. 2. In some embodiments, the query 140 includes one or more initial keywords 144 associated with the theme (T) as input by the associated user. It will be appreciated that the theme (T) 142 may be the initial keyword 144 used in identifying a set of keywords semantically related to the theme (T) 142.

As illustrated in FIG. 2, there is shown a simplified version of a semantic network 200 capable of being utilized in accordance with the systems and methods set forth herein. As shown, the network 200 utilizes implicit relationships of "is-an-example-of", and "is-associated-with." For example, "Halloween" is an example of "fall holidays", which is associated with "pumpkins", "bats", "witches", and "kids in costume". Similarly, "apples" is an example of a "fall food", and "red maple trees" is an example of "trees [with colorful] foliage", which is an example of "fall flora". Stated another way, the semantic network 200 comprises a plurality of nodes 202 (i.e., words/concepts/themes) connected to each other via links 204 (i.e., "is-an-example-of", "is-associated-with", and the like). It will be appreciated that the links 204 between nodes 202 may be weighted, indicating a greater degree of association between two nodes 202 as opposed to two other nodes 202, e.g., the link 204 connecting "Halloween" with "October" may have a greater weight than the link 204 connecting "Columbus Day" with "October", and so forth.

The illustrated network 200 of word associations illustrates that a theme "fall" is associated with the holiday "Halloween", which is associated with "pumpkins", "bats", "witches", and "kids in costume". Similarly, the theme "fall" can also be associated with the food "apples" and the flora "red maple trees". Thus, by traversing the semantic network 200, the keyword "pumpkins" can quickly be associated with other semantically related keywords, such as "witches", "apples", and "red maple trees", and the like.

Accordingly, when the theme (T) 142 selected by the user relates, for example, to "October" with an initial keyword 144 of "pumpkin", the system 100 is capable of using the semantic network 200 to realize that keyword "pumpkin" is also associated with keyword "Halloween", which is associated with keyword "witches" and keyword "kids in costume." Accordingly, the system 100 utilizes these identified keywords to expand the initial keyword 144 and includes these additional identified keywords in the keyword set $(k_1, \ldots, k_n)$ 148, for searching for images relating to the theme "October." Furthermore, the semantic network 200 utilized by the system 100 indicates that "pumpkin" is a food associated with "fall", and "apples" are also a food associated with fall. Thus, the word "apples" could also be included in the keyword set $(k_1, \ldots, k_n)$ 148, i.e., the expanded search criteria, for the user-selected theme of "October". This process of traversing the semantic network 200 (i.e., going up to a keyword's parent node, and then back down into one of the other child nodes of that parent node; and then repeating this process with higher-level nodes, i.e., grandparent nodes, great-grandparent nodes, etc.), could be continued until the desired number of alternative images 132-134 have been found from within the user's limited photo collection 130, as discussed below. Thus, the system 100 enables the generation of a set of alternative keywords that could be relevant or essentially related to the broad search intent indicated by the received theme (T) 142 and/or initial keyword 144.

It will be appreciated that while the semantic network 200 may be manually generated and tuned to a particular theme and application (e.g., FIG. 2), a semantic network for any of them could be generated automatically using a suitable knowledge source, e.g., OpenCyc, Open Mind Common Sense, etc. That is, any suitable machine-readable ontology (e.g., using Resource Description Framework (RDF), Web Ontology Language (OWL) syntax, etc.) can be mined for appropriate semantic relationships and word associations for use in the systems and methods set forth herein. Third party sources of semantic networks may also be integrated in the systems and methods set forth herein so as to assist in facilitating the selection of a set of semantically related keywords $(k_1, \ldots, k_n)$ 148.

The instructions 108 may further include a weighting component 150 configured to determine a suitable weight 152 to be assigned to an association (e.g., link 204) between keywords 148 of the semantic network 146. In accordance with some embodiments, the weights 152 assigned to each link 204 between nodes 202 of the semantic network 146 may be updated in accordance with user feedback, i.e., user selection of a particular image 132-134 associated with a particular query 140, i.e., theme (T) 142 and initial keywords 144, with respect to a particular keyword set $(k_1, \ldots, k_n)$ 148, or the like. The keyword identifier component 138 may utilize such weights in identifying the suitable keyword set $(k_1, \ldots, k_n)$ 148 corresponding to the received theme (T) 142 and/or initial keyword(s) 144, i.e., nodes 202 having greater weights 152 are included in the keyword set $(k_1, \ldots, k_n)$ 148 over those nodes 202 having lesser weights 152.

In other embodiments, the weighting component 150 may be used to apply weights 152 to images 132 stored in the local photo-collection 130. In such an embodiment, the weighting component 150 may increase or decrease the weight 152 of an image 132 based upon the number of keywords 148 matched by the image's metadata 136, i.e., an image 132 that matches to multiple keywords may be weighted higher than an image 132 that match only a few keywords in the set 148. It will be appreciated that such adaptive weighting may be utilized herein so as to differentiate between ambiguous meanings of a particular keyword 144.

Returning to FIG. 1, the instructions 108 stored in memory 106 of the computer system 102 further includes a search module 154 configured to perform one or more searches of the photo collection 130 for images 132-134 in response to the received query 140. The search module 154 may be configured to receive the keyword set $(k_1, \ldots, k_n)$ 148 from the keyword identifier component 138 and perform a search of the metadata 136 associated with images 132 in the photo-collection 130. In one embodiment, each image 132 in the photo-collection 130 includes metadata corresponding to keywords, concepts, themes, or the like, associated with that particular image 132. Accordingly, the search module 154 is capable of retrieving a set of images 132 associated with the keyword set $(k_1, \ldots, k_n)$ 148 from the photo-collection 130.

In other embodiments, one or more images 134 may be stored in the photo-collection 130 that include no or minimal metadata 136. In such embodiments, the system 102 may employ the search module 154 to retrieve a set of images from one or more third party repositories 176 and/or 178, and communicate this set of images to a trainer module 156 to facilitate in the classification of images 134 lacking metadata 136 in the local photo-collection 130 with respect to themes (T) 142, keywords 144, 148, and the like.

The trainer module 156 stored in instructions 108 may be configured to interact with one or more third party repositories of images 176-178 to retrieve a set of images which correspond to the keyword set $(k_1, \ldots, k_n)$ 148. The trainer module 156 may utilize this set of images to train a set of visual classifiers $(K_1, \ldots, K_n)$ 158 so as to learn the visual concepts associated with the keyword set $(k_1, \ldots, k_n)$ 148. That is, the search module 154 may retrieve one or more images from the repositories 176-178 which correspond to each keyword in the set of keywords $(k_1, \ldots, k_n)$ 148. The trainer module 156 then analyzes each image to learn the visual concepts associated with each keyword as indicated in the corresponding images, i.e., the trainer module 156 trains a set (C) of classifiers $(K_1, \ldots, K_n)$ 158. This set may then be communicated to a classification component 160 to classify each image 134 in the local photo-collection 130, i.e., assign metadata 162 to each image 134 corresponding to the keyword associated therewith. The set may also be used to modify the metadata 136 of images 132 already having metadata 136, as discussed below.

The trainer module 156 may further test or otherwise analyze the set of visual classifiers $(K_1, \ldots, K_n)$ 158 so as to determine which classifier(s) perform well, e.g., metrics such as top-1 accuracy can be used to test the precision of each classifier $(K_1, \ldots, K_n)$ 158. The trainer module 156 may then generate the set of visual classifiers $(K_1, \ldots, K_n)$ 158 via selection of those classifiers with performances (e.g., accuracy) above a predetermined threshold, e.g., for top-1 accuracy, those classifiers having precision greater than 0.40 are added to the set of classifiers $(K_1, \ldots, K_n)$ 158. Thus, the trainer module 156 is configured to assess the quality of each of the set of classifiers $(K_1, \ldots, K_n)$ 158 so as to ensure good performance via selection of classifiers $(K_1, \ldots, K_n)$ 158 with higher levels of performance.

The classification component 160 in instructions 108 of memory 106 may be configured to utilize the visual classifiers $(K_1, \ldots, K_n)$ 158 to classify, i.e., assign metadata, to each image 134 in the local photo-collection 130 not previously having metadata 136, or to update the metadata 136 of images 132. The classification component 160 may utilize a variety of advanced image recognition and/or image categorization techniques to suitably identify images 134 stored in the local photo-collection 130 which correspond to a particular theme (T) 142, keyword 144, or keywords 148. Accordingly, reference herein to the use of visual classifiers $(K_1, \ldots, K_n)$ 158 is for exemplary purposes and other methods may be implemented in accordance with the systems and methods set forth herein. Once the images 134 have been updated with the metadata 162, the query 140 may be re-run or updated so as to enable an image output component 164 to output a suitable result set 166 of images that correspond to the theme (T) 142 and the expanded set of keywords $(k_1, \ldots, k_n)$ 148, thus providing a number of semantically related images to the user in response to the query 140. In one embodiment, the classification component 160 is configured to generate the metadata 162 for an image 132-134 based upon the classification of the image 132-134 and/or the determined weight 152 of the link between the image 132-134 and the corresponding keyword 144.

The image output component 164 may be configured to generate a result set 166 of images retrieved by the search module 154 corresponding to the expanded keyword set $(k_1, \ldots, k_n)$ 148 semantically related to the theme (T) 142 and/or initial keyword(s) 144. In one embodiment, the images 132-134 having the highest classification scores, as determined by the trainer module 156 and/or the classification component 160, are used to generate the image result set 166.

It will be appreciated that the finite collection of images searching system 100 illustrated in FIG. 1 is capable of implementation using a distributed computing environment, such as a computer network 116, which is representative of any distributed communications system capable of enabling the exchange of data between two or more electronic devices. It will further be appreciated that such a computer network includes, for example and without limitation, a virtual local area network, a wide area network, a personal area network, a local area network, the Internet, an intranet, or any suitable combination thereof. Accordingly, such a computer network comprises physical layers and transport layers, as illustrated by various convention data transport mechanisms, such as, for example, Token-Ring, Ethernet, or other wireless or wire-based data communication mechanisms. Furthermore, while depicted in FIG. 1 as a networked set of components, the systems and methods discussed herein are capable of implementation on a stand-alone device adapted to perform the methods described herein.

The computer system 102 may be in data communication with the network 116 via a communications link 118 with the I/O interface 112. A suitable communications link 118 may include, for example, the public switched telephone network, infrared, optical, or other suitable wired or wireless data transmission communications.

The computer system 102 may further be in communication with one or more third party image collections, represented by the servers 168 and 170. In one embodiment, the computer system 102 is in data communication with a website or other hosted connection of the servers 168-170, enabling access to the first image collection 176 and the second image collection 178 stored thereon. As shown in FIG. 1, the server 168 is in data communication with the first image collection 176 stored on an associated data storage device 172, and the server 170 is in data communication with the second image collection 178 stored on an associated data storage device 174.

The servers 168 and 170 may include a processor and memory storing instructions that facilitate interactions with the computer system 102, and the like. It will be appreciated that the servers 168-170 may include any hardware, software, or combinations thereof, capable of implementing the systems and methods described herein. Suitable examples of such hardware includes, for example and without limitation, processors, hard disk drives, volatile and non-volatile memory, a system bus, user interface components, display components, and the like. It will further be appreciated that multiple such devices may be used as the servers 168-170 in accordance with the subject application. It will also be appreciated that while illustrated in FIG. 1 as being a separate component of the system 100, the data storage devices 172-174 are capable of being implemented as internal storage components of the respective server 168-170, such as, for example and without limitation, internal hard disk drives, or the like.

In accordance with one embodiment, each server 168-170 represents a third party repository of images, files, etc., which are accessible by the computer system 102 via the network 116. Such repositories may be photo-hosting entities, such as FLICKR, PHOTOBUCKET, or other stock photographic website. In such an embodiment, the servers 168 and 170 are in data communication with the network 116 via respective communication links 180 and 182. Suitable communications links 180-182 may include, for example and without limitation, the public switched telephone network, a proprietary communications network, infrared, optical, or any other suitable wired or wireless data transmission communications.

The computer system 102 may include a computer server, workstation, personal computer, cellular telephone, tablet computer, pager, combination thereof, or other computing device capable of executing instructions for performing the exemplary method.

According to one example embodiment, the computer system 102 includes hardware, software, and/or any suitable combination thereof, configured to interact with an associated user, a networked device, networked storage, remote devices, or the like.

The memory 106 may represent any type of non-transitory computer readable medium such as random access memory (RAM), read only memory (ROM), magnetic disk or tape, optical disk, flash memory, or holographic memory. In one embodiment, the memory 106 comprises a combination of random access memory and read only memory. In some embodiments, the processor 104 and the memory 106 may be combined in a single chip. The network interfaces 112 and/or 114 may allow the computer system 102 to communicate with other devices via a computer network, and may comprise a modulator/demodulator (MODEM). Memory 106 may store data processed in the method as well as the instructions for performing the exemplary method.

The digital processor 104 can be variously embodied, such as by a single core processor, a dual core processor (or more generally by a multiple core processor), a digital processor and cooperating math and/or graphics coprocessor, a digital controller, or the like. The digital processor 104 in addition to controlling the operation of the computer system 102, executes the instructions 108 stored in the memory 106 for performing the method outlined in FIGS. 3-4.

The term "software," as used herein, is intended to encompass any collection or set of instructions executable by a computer or other digital system so as to configure the computer or other digital system to perform the task that is the intent of the software. The term "software," as further used herein, is intended to also encompass such instructions stored in storage mediums, such as RAM, a hard disk, optical disk, or so forth, and is intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 3:
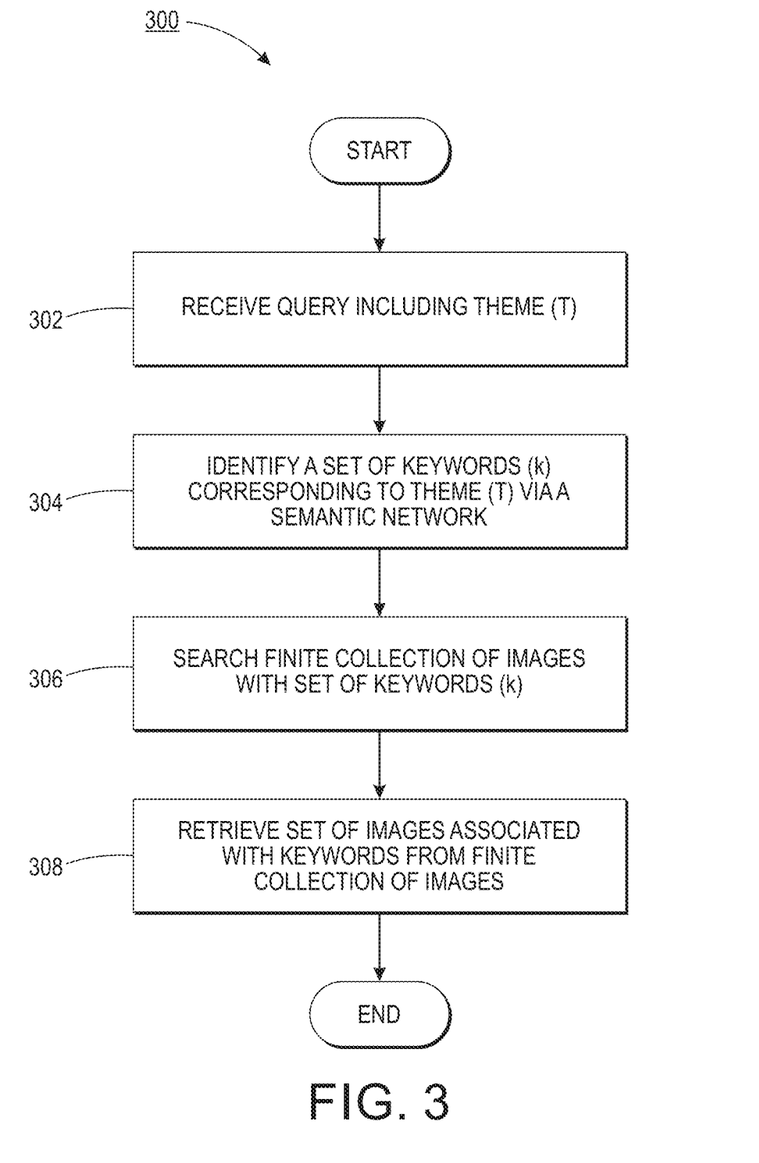
FIG. 3 is a flowchart that illustrates one aspect of the method for searching a finite collection of images using at least one semantic network according to an exemplary embodiment.

Turning now to FIG. 3, there is provided an overview of the exemplary method for searching a finite collection of images using at least one semantic network. The method 300 begins at 302, whereupon the computer system 102 receives a query 140 from an associated user that includes a theme (T) 142. In some embodiments, the query 140 may also include one or more keywords 144 associated with the theme (T) 142.

At 304, a set of keywords $(k_1, \ldots, k_n)$ 148 is then identified corresponding to the received theme (T) 142 via a semantic network 146. As discussed above, the semantic network 146 may be implemented as a network of semantically associated words, i.e., a network that represents the semantic relations between concepts, such as the semantic relationship between the theme (T) 142 and the various keywords 144. At 306, the finite collection of images, i.e., the local photo-collection 130, is searched for images 132-134 corresponding to the set of keywords 144 ascertained from the semantic network 146. At 308, the computer system 102, via the image output component 164 or other suitable component associated with the computer system 102, retrieves a set of result images 166 from the finite collection 130 responsive to the search at 306.

Figure 4:
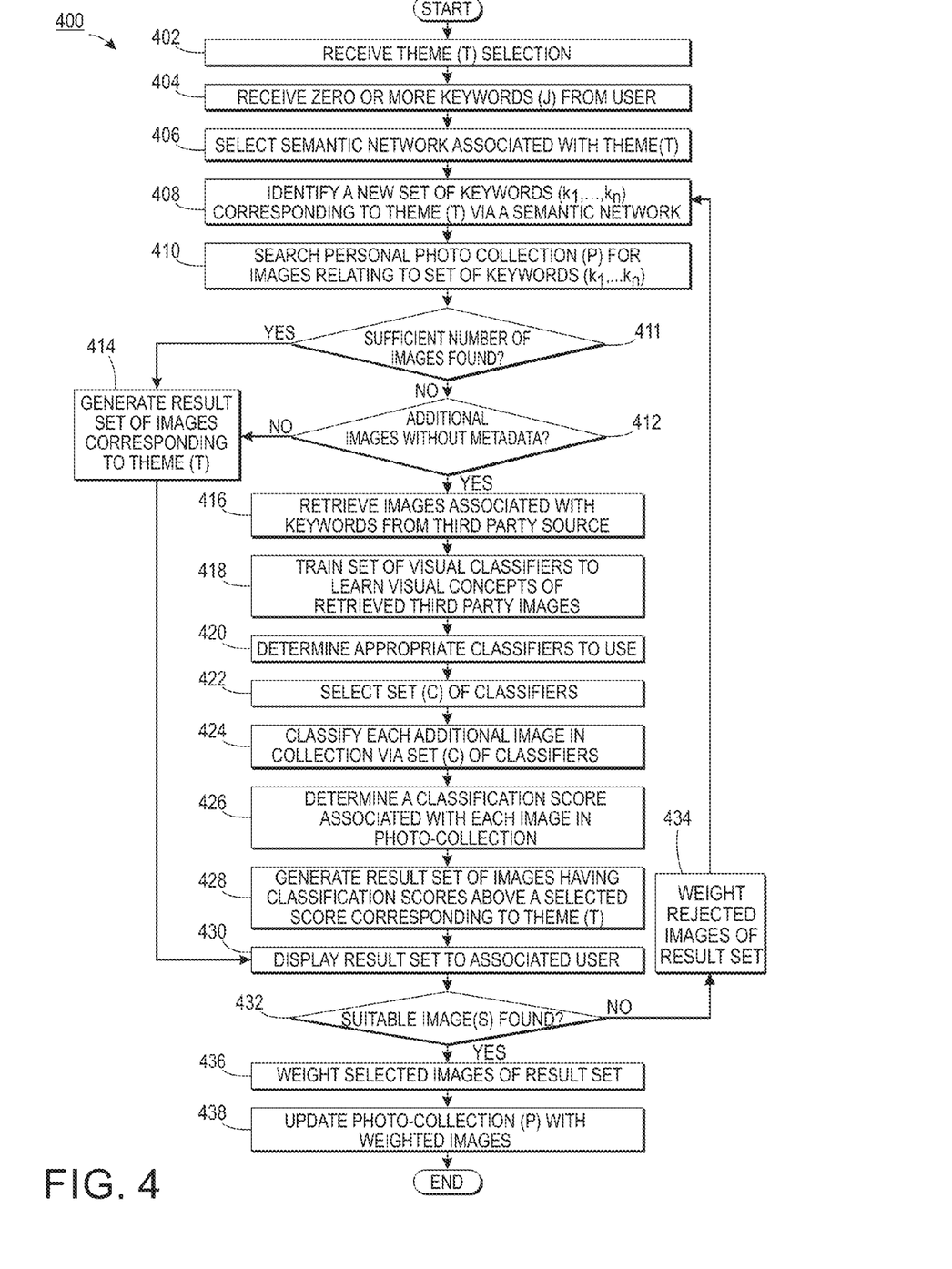
FIG. 4 is a flowchart that illustrates another aspect of the method for searching a finite collection of images using at least one semantic network according to an exemplary embodiment.
Figure 5:
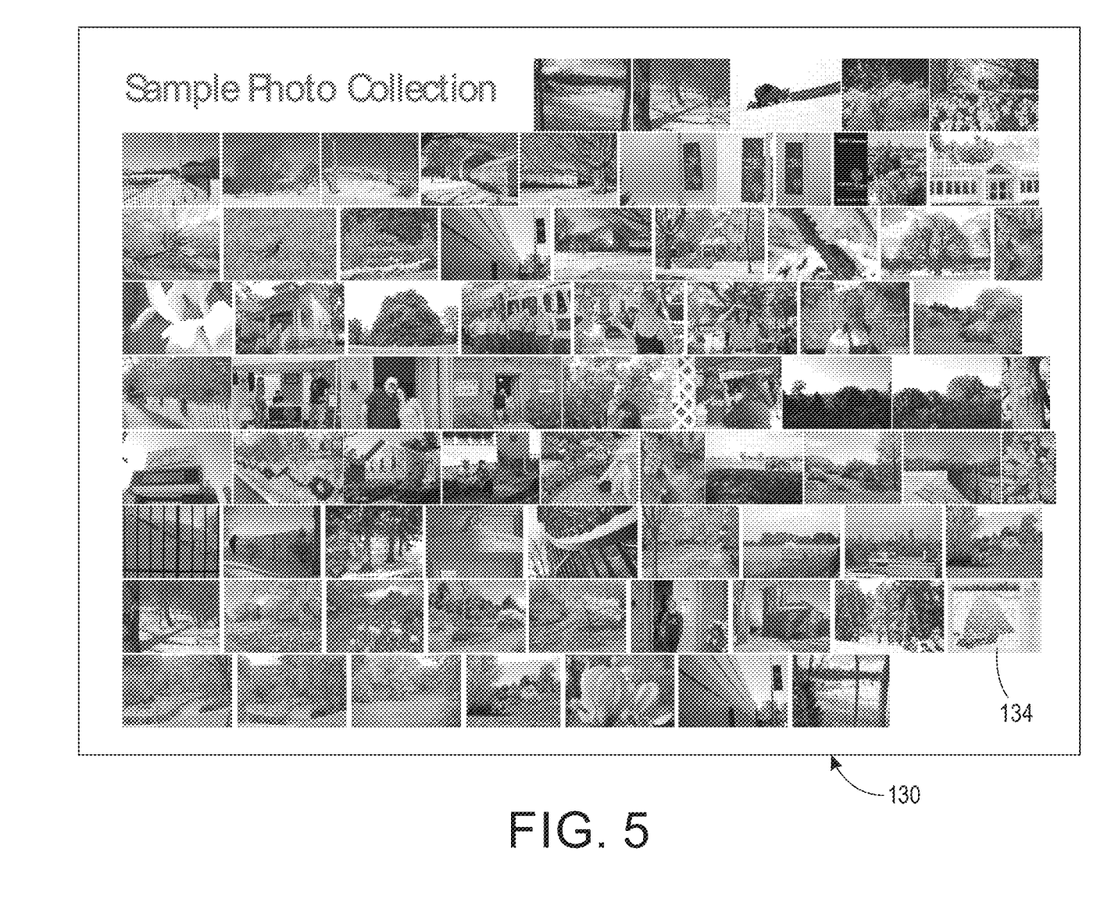
FIG. 5 illustrates a sample finite collection of images according to an exemplary embodiment.
Figure 6:
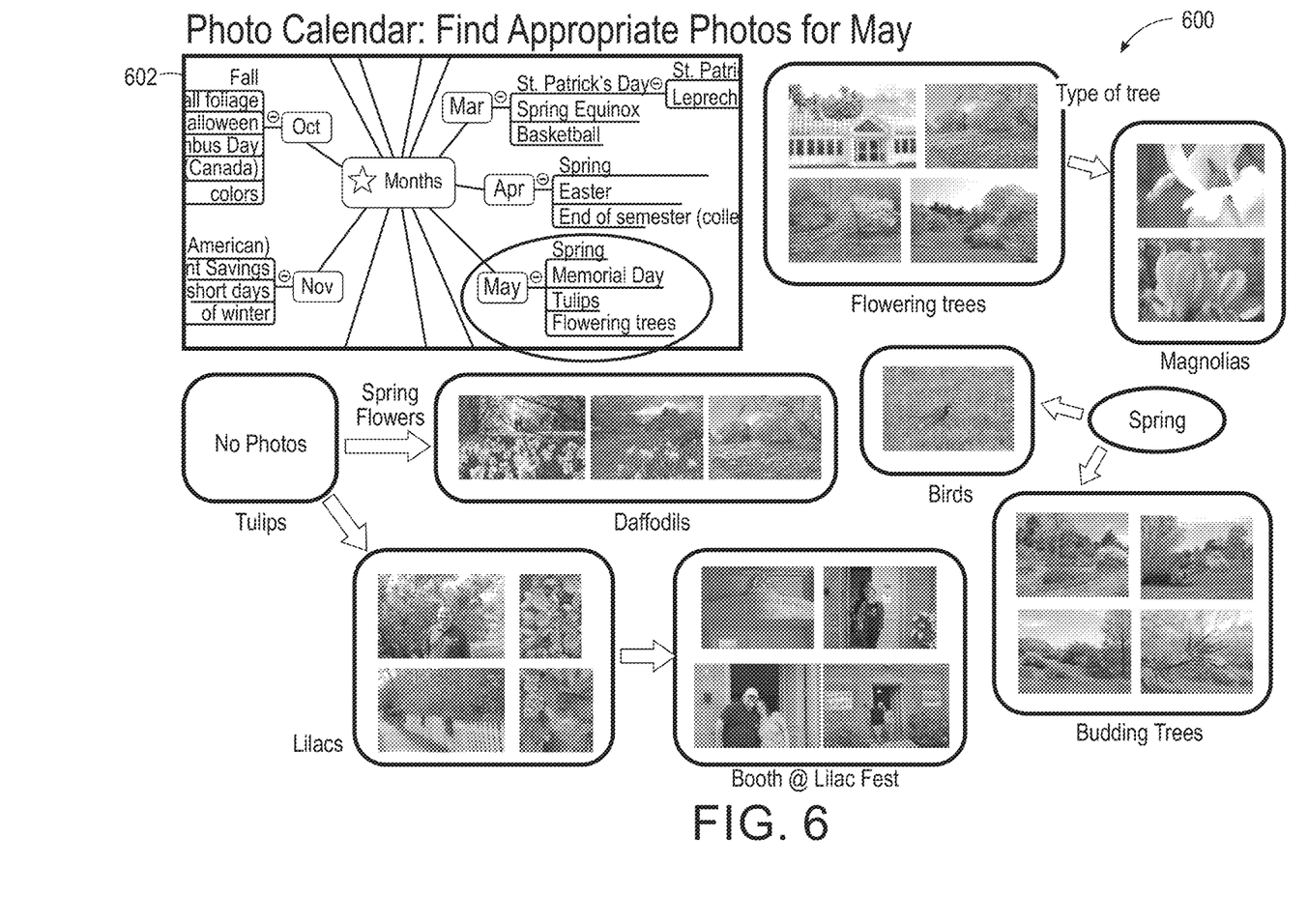
FIG. 6 illustrates an example use of a semantic network in identifying photographs of the sample collection of FIG. 5 corresponding to a selected May theme according to one aspect of the exemplary embodiment.
Figure 7:
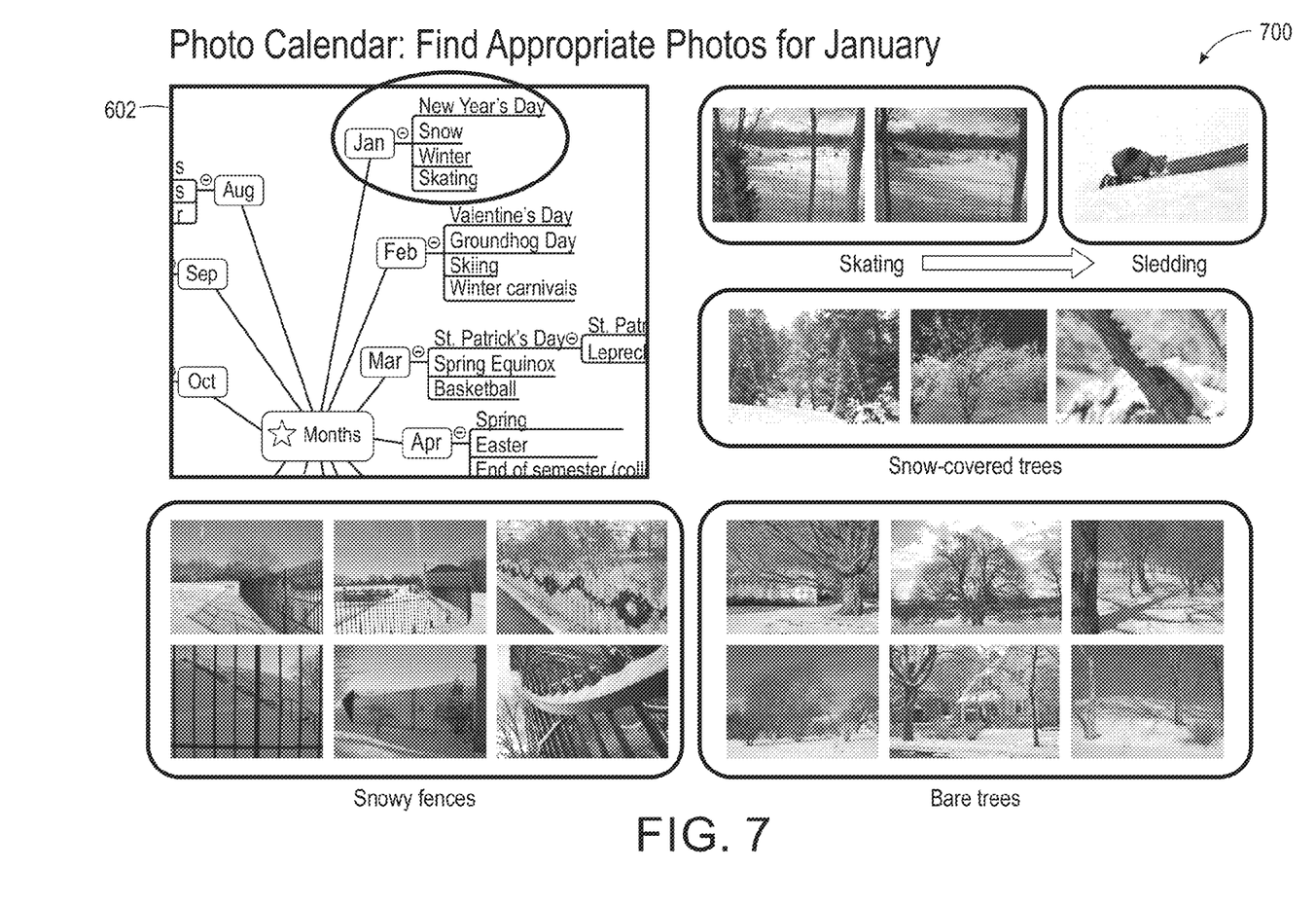
FIG. 7 illustrates an example use of a semantic network in identifying photographs of the sample collection of FIG. 5 corresponding to a selected January theme according to one aspect of the exemplary embodiment.

Turning now to FIG. 4, with reference to FIGS. 5, 6, and 7, there is provided a detailed illustration of the exemplary method 400 for searching a finite collection of images using at least one semantic network according to one aspect of the subject disclosure. The method 400 begins at 402, whereupon a theme (T) 142 is received from an associated user via the user input device 124. As discussed above, the theme (T) 142 may correspond, for example, to a season, holiday, concept, occasion, event, date, or the like. At 404, zero or more keywords (j) 144 are received from the associated user. In one embodiment, the theme (T) 142 and keywords (j) 144 are received as a query 140 from the associated user. In another embodiment, no initial keywords (j) 144 are received from the associated user, i.e., j=NULL. Instead, only the theme (T) 142 is received and is used as a keyword 144. It will be appreciated that the one or more initial keywords (j) 144 supplied by the user can be associated with (i.e., semantically linked to) the theme (T) 142. For example, the query 140 may correspond to a photo-calendar or other personalized print artifact in which the user desires to include one or more thematically related images. Thus, in such an example, the query 140 supplied by the user may include a theme (T) 142 such as "May" (FIG. 6) or "January" (FIG. 7) and keywords (j) 144 such as "flowers", "snow", or the like.

At 406, the keyword identifier component 138 or other suitable component associated with the computer system 102 selects a suitable semantic network 146 corresponding to the received theme (T) 142. As discussed above, a semantic network 146 may correspond to a network of semantically associated words, i.e., a network that represents the semantic relations between concepts. Stated another way, a semantic network may be implemented as a graph consisting of nodes that represent physical or conceptual objects and arcs that describe the relationship between the nodes, resulting in something like a data flow diagram. Semantic nets are an effective way to represent data as they incorporate the inheritance mechanism that enables disambiguation of data. That is, the meaning of a concept comes from its relationship to other concepts and the information is stored by interconnecting nodes with labeled arcs.

It will be appreciated that the selection of the semantic network 146 may be accomplished using both the theme (T) 142 and the keywords (j) 144. In some embodiments, the semantic network 146 may be modified by the keyword identifier component 138 so as to include all keywords 144 initially received (if new) or to add weights to existing links 204 between nodes 202 of the semantic network 146 responsive to the received keywords (j) 144 being associated with the theme (T) 142 by the user in the query 140.

At 408, a new set of keywords $(k_1, \ldots, k_n)$ 148, corresponding to the theme (T) 142 and including initial keywords (j) 144 (if any), is identified by the keyword identifier component 138 or other suitable component associated with the computer system 102 in accordance with the selected semantic network 146. That is, the identifier component 138 analyzes the semantic network 146 selected in accordance with the theme (T) 142 and identifies those keywords (nodes 202) semantically linked to the theme (T) 142. In some embodiments, the set of keywords $(k_1, \ldots, k_n)$ 148 is selected based upon the relative weights of the links 204 between the keyword and the theme (T) 142 as indicated on the semantic network 146. As previously discussed, for the theme (T) 142 "October", the keyword "Columbus Day" may have a lower weighted link to "October" than the keyword "Halloween", indicating that the keyword "Halloween" would be added to the set of keywords $(k_1, \ldots, k_n)$ 148 rather than "Columbus Day". In embodiments wherein zero initial keywords (j) 144 are supplied by the user at 404, a set of keywords $(k_1, \ldots, k_n)$ 148 corresponding to the theme (T) 142 may be identified at 408 and used in accordance with the methodology set forth hereinafter using the set of keywords $(k_1, \ldots, k_n)$ 148 identified solely from the theme (T) 142. In other embodiments, the theme (T) 142 may be used as one of the initial keywords (j) 144.

At 410, the search module 154 or other suitable component associated with the computer system 102 searches a finite collection of images, i.e., the local photo-collection 130, using the set of keywords $(k_1, \ldots, k_n)$ 148 with respect to those images 132 stored in the collection 130 having pre-existing metadata 136. That is, the search module 154 searches the pre-existing metadata 136 of images 132 in the photo-collection 130 for images that include one or more keywords of the set of keywords $(k_1, \ldots, k_n)$ 148. A determination is then made at 411 whether a sufficient number of images in the collection 130 has been found. Upon a positive determination, operations proceed to 414, whereupon a result set of images 166 corresponding to theme (T) 142 is generated as discussed in greater detail below.

Upon a determination at 411 that a sufficient number of images 132 are not present in the photo-collection 130, operations proceed to 412. For example, when there are not enough images associated with the theme (T) 142, i.e., there are not a preselected minimum number of images, additional images from the image sets 132-134 may be needed to present the associated user with the preselected minimum number of images from the photo-collection 130. At 412, a determination is made whether any other images 134 are present in the photo-collection 130 that do not have any pre-existing metadata 136. Upon a negative determination at 412, i.e., no other images 134 are present in the collection 130, operations proceed to 414, whereupon the image output component 164 or other suitable component associated with the computer system 102 generates a result set 166 of images 132 that semantically correspond to the theme (T) 142 and the set of keywords $(k_1, \ldots, k_n)$ 148. According to one embodiment, the result set of images 166 may be generated utilizing the relative weights 152 of respective images 132 in the collection 130 such that only those images 132 having greater relative weight 152 than other images 132 are included in the result set 166.

The result set 166 is then displayed, via the display 122, to the user at 430, and a determination is made at 432 whether a suitable image or images in the result set 166 is found. That is, whether the associated user has found a desired image or images corresponding to the queried theme (T) 142. Upon a positive determination, operations proceed to 436, whereupon weighting component 150 applies weights 152 to selected images of the result set 166. For example, suitable image or images selected by the associated user may have their respective weights 152 increased while other images in the set 166 may have their respective weights 152 decreased. The photo-collection 130 is then updated at 438 in accordance with the weights 152 assigned by the weighting component 150 and operations with respect to FIG. 4 terminate thereafter.

Returning to 412, upon a determination that the photo-collection 130 includes one or more images 134 that lack pre-existing metadata 136 (i.e., images 134 that are not keyword searchable or have minimal keywords associated with them), operations proceed to 416. At 416, the search module 154 or other suitable component associated with the computer system 102 searches for and retrieves images from one or more third-party sources 168 and/or 170, i.e., the first image collection 176 and/or the second image collection 178. Suitable examples of such third-party sources 168, 170 may include online stock photographic image providers, such as FLICKR, Library of Congress, SHUTTERFLY, ADOBE PHOTOSHOP, SHUTTERSTOCK, ASSOCIATED PRESS images, REUTERS, GETTY, and the like. It will be appreciated that such sources 168, 170 may be publicly accessible or pay services.

The trainer module 156 or other suitable component associated with the computer system 102 then trains, at 418, a set of visual classifiers 158 to learn the visual concepts of the retrieved third-party images, i.e., to learn the visual concepts associated with each particular keyword in the set of keywords $(k_1, \ldots, k_n)$ 148. In accordance with one embodiment, the trainer module 156 analyzes each image retrieved by the search module 154 to learn the visual concepts associated with each keyword as indicated in the corresponding images, i.e., the trainer module 156 trains a set (C) of classifiers $(K_1, \ldots, K_n)$ 158.

At 420, the trainer module 156 or other suitable component associated with the computer system 102 determines which classifier(s) $(K_1, \ldots, K_n)$ 158 perform well, e.g., metrics such as top-1 accuracy can be used to test the precision of each classifier $(K_1, \ldots, K_n)$ 158. Based upon this determination, at 422, a set of visual classifiers (C) is selected by the trainer module 156 corresponding to those classifiers $(K_1, \ldots, K_n)$ 158 with performances (e.g., accuracy) above a predetermined threshold, e.g., for top-1 accuracy, those classifiers having precision greater than 0.40 are added to the set of classifiers (C).

Each additional image 134 in the local photo-collection 130 is then classified at 424 via the classification component 160 using the set of classifiers (C). That is, the classification component 160 may generate metadata 162 corresponding to these images 134 (e.g., the set of keywords $(k_1, \ldots, k_n)$ 148, theme (T) 142, etc.), based upon the correspondence of the third-party images and the images 132 stored in the local collection 130. Stated another way, once the visual concepts of the third-party images are learned by the classifiers $(K_1, \ldots, K_n)$ 158, the classification component 160 may apply the classifiers $(K_1, \ldots, K_n)$ 158 to each image 134 without pre-existing metadata 136 so as to allow subsequent keyword searching thereof. The set of classifiers (C) may also be used to modify the metadata 136 of images 132 already having metadata 136. As discussed above, the classification component 160 is capable of using a variety of advanced image recognition and/or image categorization techniques to suitably identify images 134 stored in the local photo-collection 130 which correspond to a particular theme (T) 142 or keywords 144, 148, or the like.

At 426, a classification score is determined for each image 132-134 in the local photo-collection 130 via the classification component 160. The classification score, as will be appreciated, may be determined in accordance with application of the classifiers $(K_1, \ldots, K_n)$ 158 to each image 132-134. In particular, the lexical structure (semantic network 146) can be used to correct inconsistencies among scores produced by the visual classifier 158. Alternatively, if metadata is associated with the image 132-134, the lexical structure can be used to automatically generate new tags by examining adjacent nodes 202 with high weight 152.

A result set of images 166 comprising the images 132-134 having the highest classification scores is then generated at 428 by the image output component 164 corresponding to the expanded keyword set $(k_1, \ldots, k_n)$ 148 semantically related to the theme (T) 142 and/or initial keyword(s) 144. In one embodiment, images 132-134 having a classification score above a predetermined threshold or value are included in the result set of images 166. It will be appreciated that the threshold or value may be determined by the user, automatically by the system 102 (based on the visual concepts, similarity calculations, etc.), or the like. The result set of images 166 is then displayed to the associated user at 430 via the display device 122 for subsequent selection of a desired image. Operations then proceed to 432, whereupon a determination is made whether a suitable image or images are included in the result set 166. As discussed above, when a positive determination is made by the user, operations progress through 436-438. Upon a negative determination at 432, operations proceed to 434, whereupon the rejected images 132 of the result set 166 are weighted by the weighting component 150 accordingly. For example, the rejected images 132 may have the weights 152 respectively decreased. Thereafter, operations return to 408, whereupon a new set of keywords $(k_1, \ldots, k_n)$ 148 is identified in accordance with the theme (T) 142 and any initial keywords (j) 144. In one embodiment, the set of keywords $(k_1, \ldots, k_n)$ 148 may thereafter automatically be expanded to include additional possibilities, i.e., grandchild nodes, etc., from the semantic network 146. It will be appreciated that once the images 134 have been updated with the metadata 162, the query 140 may be re-run or updated so as enable an image output component 164 to output a suitable result set 166 of images that correspond to the theme (T) 142 and the expanded set of keywords $(k_1, \ldots, k_n)$ 148, thus providing a number of semantically related images to the user in response to the query 140 in the result set 166 at 428.

The operations of FIGS. 3-4 will be better understood in view of the example implementation of FIGS. 5, 6, 7, and 8, wherein a user desires to create a personal print artifact in the form of a photo-calendar. In such an example, FIG. 5 illustrates a sample collection 130 of images 134 that are stored in the local storage 126 of the computer system 102, from which are to be selected images for inclusion in a personalized print artifact, e.g., a photo-calendar. As shown in FIG. 5, the sample collection 130 includes a variety of images 134 comprising disparate times, themes, and the like. It may be assumed that no metadata or little metadata 136 is available, i.e., the user has not supplied multiple keywords for each image. In accordance with the example, it may further be assumed that the user desires to include at least one image 134 corresponding to each month, thus selecting a theme 142 of "January", "February", etc. for each page of the calendar.

Turning now to FIGS. 6 and 7, there are shown two diagrams 600 and 700 respectively illustrating the selection of an image 134 from the collection 130 of available images with respect to the theme 142 of a page. It will be appreciated that FIGS. 6 and 7 illustrate how semantic networks 146 may be used to aid in the selection process for images of the months of "May" (FIG. 6) and "January" (FIG. 7), rather than requiring the user to sift through each image 134 of the collection 130 manually. It will further be appreciated that FIGS. 6 and 7 illustrate how semantic networks 146 may be utilized to automatically suggest similar, relevant images 134 in response to a theme (T) 142 (e.g., "May" or "January"), and the user's choice of initial keywords 144 (e.g., "spring", "flowering trees", etc., for "May", and "snow", "winter", "skating" etc., for January).

As shown in FIG. 6, a semantic network 602 associated with "months" is utilized to identify additional keywords for inclusion in a set of keywords $(k_1, \ldots, k_n)$ 148 for searching the photo-collection 130 relating to "May". FIG. 6 also presents a functional diagram 600 graphically illustrating images from the collection 130 corresponding to various semantically linked keywords in accordance with the systems and methods set forth herein. The initial keywords 144 supplied by the user include "spring", "Memorial Day", "tulips", and "flowering trees". The initial collection 130 includes no pictures of "tulips", and thus a semantic network is used to associate "tulips" with other spring flowers, i.e., "daffodils", "lilacs", etc. Similarly, "flowering trees" images are not present in the collection 130, and a semantic network 146 is used to associate "flowering trees" with a specific type of flowering tree, i.e., "magnolias". In addition, the systems and methods set forth herein render the keyword "spring" less ambiguous by using a semantic network 146 to look for "signs of spring", which yields "birds", "budding trees", etc.

Similarly, FIG. 7 depicts the semantic network 602 associated with "months" that is used to identify additional keywords for inclusion in the set of keywords $(k_1, \ldots, k_n)$ 148 for searching the photo-collection 130 relating to "January". FIG. 7 further presents a functional diagram 700 that graphically illustrates images from the collection 130 corresponding to various semantically linked keywords in accordance with the systems and methods set forth herein. The initial keywords 144 received from the user are illustrated in the diagram 700 of FIG. 7 to illustrate the various associations between the initial keywords 144 "New Year's Day", "snow", "winter", and "skating". As shown, the keyword 144 "skating" retrieves two pictures of a frozen skating pond, however the images may not be visually appealing to the user. Using semantic networks 146, "skating" may be associated with "sledding" (another winter sport), which yields a subjectively better image to the user. Similarly, semantic networks 146 can be used to associate "snow" and "winter" with "signs of winter", such as "bare trees", "snow-covered trees", and "snowy fences", as illustrated in FIG. 7.

Figure 8:
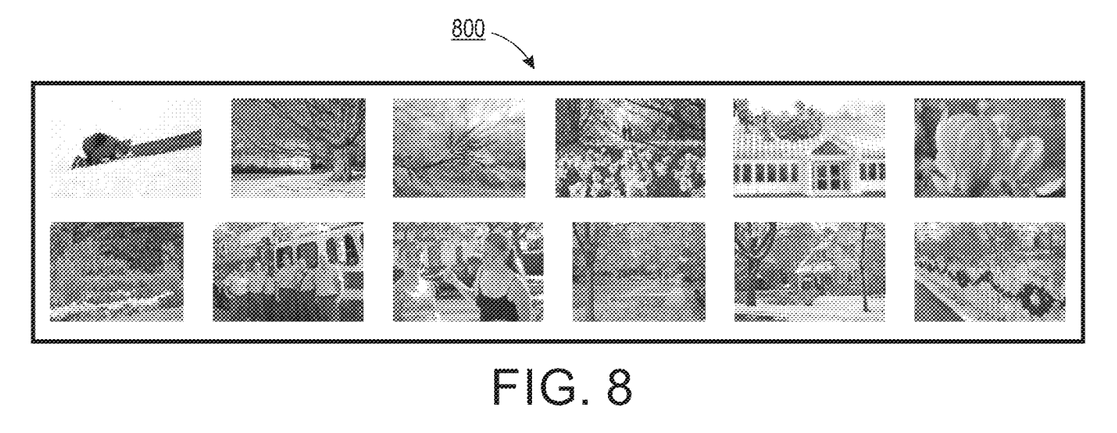
FIG. 8 illustrates an example output set of photographs from the sample collection according to FIGS. 5-7.

It will be appreciated that the semantic networks and processes illustrated in FIGS. 6-7 may be used for each month in the photo-calendar example. For example, "March" may utilize "rain", "St. Patrick's Day", "green", etc. FIG. 8 depicts a resulting set 800 of images 134 for use in such a calendar, i.e., twelve images each of which represents a particular month of the year, selected from the user's own photo-collection 130.

The method illustrated in FIGS. 3-4 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer (s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 3-4, can be used to implement the method for searching a finite collection of images using at least one semantic network.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for searching a finite collection of images using at least one semantic network, comprising:
   receiving a query from an associated user, the query comprising a theme;
   identifying a set of keywords associated with the theme, each of the set of keywords being semantically linked to the theme via the at least one semantic network;
   searching the finite collection of images for images having metadata relating to the identified set of keywords;
   determining if the images relating to the identified set of keywords from the finite collection of images exceeds a predetermined number of images; and
   determining, in response to a determination that the number of images relating to the identified set of keywords from the finite collection of images does not meet or exceed the predetermined number of images, that the finite collection of images includes additional images without metadata;
   retrieving a set of images from a remote collection of images corresponding to the identified set of keywords responsive to the determination that the finite collection of images includes additional images without metadata;
   training a plurality of visual classifiers to learn a set of visual concepts corresponding to the set of keywords from the retrieved set of images;
   selecting a set of visual classifiers for application to each image in the finite collection of images without metadata;
   classifying each image in the finite collection of images without metadata in accordance with the selected set of visual classifiers;
   searching the finite collection of images with the identified set of keywords, the finite collection of images including a plurality of images having metadata associated therewith and at least one classified image; and
   retrieving a result set of images corresponding to the theme from the finite collection of images responsive to a result of the searching thereof the result set including at least one classified image,
   wherein at least one of the receiving, identifying, training, selecting, classifying, searching, and retrieving is performed by a computer processor.

2. The method according to claim 1, wherein the remote collection of images comprises at least one-third party image repository, and wherein each image in the remote collection of images includes metadata.

3. The method according to claim 2, wherein the query includes at least one initial keyword, and wherein set of keywords includes the at least one initial keyword.

4. The method according to claim 1, wherein selecting the set of visual classifiers further comprises:
   testing each of the plurality of visual classifiers with respect to accuracy thereof, wherein selecting the set of visual classifiers includes selecting each visual classifier having a performance above a predetermined threshold, and wherein the predetermined threshold is a precision greater than 0.40.

5. The method according to claim 4, further comprising:
classifying each image in the finite collection of images in accordance with the selected set of visual classifiers; and
determining a classification score associated with each image in the finite collection of images,
wherein retrieving the set of result images comprises retrieving each image of the finite collection having a classification score above a predetermined value.

6. The method according to claim 5, wherein the at least one semantic network includes a plurality of nodes and at least one link between each of the plurality of nodes, each node corresponding to a keyword.

7. The method according to claim 6, wherein identifying the set of keywords further comprises:
determining a weight associated with each link between nodes associated with the theme; and
identifying the set of keywords corresponding to each node having an associated weight greater than a predetermined value.

8. The method according to claim 5, wherein each image in the finite collection of images includes a weight corresponding to a number of keywords associated therewith, and wherein retrieving the result set of images corresponding to the theme from the finite collection of images responsive to a result of the searching further comprises retrieving images having greater weights.

9. The method according to claim 8, wherein classifying each image in the finite collection of images further comprises adjusting the weight of an image in the finite collection of images responsive to a selection thereof by a user.

10. A system for searching a finite collection of images using at least one semantic network, comprising:
a keyword identifier component configured to identify a set of keywords semantically associated with a theme using the at least one semantic network;
a classification component configured to classify each image in the finite collection of images according to a visual concept;
a memory device which stores instructions for:
searching the finite collection of images for images having metadata relating to the identified set of keywords;
determining if the images relating to the identified set of keywords from the finite collection of images exceeds a predetermined number of images; and
determining, in response to a determination that the number of images relating to the identified set of keywords from the finite collection of images does not meet or exceed the predetermined number of images, that the finite collection of images includes additional images without metadata,
retrieving, from a remote collection of images, at least one image corresponding to each of the set of keywords responsive to the determination that the finite collection of images includes additional images without metadata,
training a plurality of classifiers for the classification component, each of the plurality of classifiers corresponding to a visual concept corresponding to at least one of the set of keywords associated with at least one of the images retrieved from the remote collection,
selecting a set of visual classifiers for application to each image without metadata in the finite collection of images,
classifying each image without metadata in the finite collection of images in accordance with a selected set of classifiers,
searching the finite collection of images in accordance with the identified set of keywords, the finite collection of images having metadata associated therewith and at least one classified image, and
retrieving a result set of images corresponding to the theme and the set of keywords from the finite collection of images responsive to a result of the searching thereof; and
a processor in communication with the memory device which executes the instructions.

11. The system according to claim 10, wherein the finite collection of images is stored in a local data storage device and the remote collection of images is stored in a remote third-party data storage device.

12. The system according to claim 10, wherein the memory device stores instructions for:
testing each of the plurality of classifiers with respect to accuracy thereof, wherein the set of classifiers includes each classifier testing above a predetermined threshold.

13. The system according to claim 12, wherein the classification component is further configured to determine a classification score associated with each image in the finite collection of images, and wherein retrieving the set of result images comprises retrieving each image of the finite collection having a classification score above a predetermined value.

14. The system according to claim 13, further comprising a weighting component configured to increase or decrease a weight of an association between a keyword and an image in the finite collection of images, wherein the weight is used by the classification component in determining the classification score associated with the image.

15. The system according to claim 14, wherein the classification component is further configured to generate metadata for at least one image in the finite collection of images in accordance with the classification thereof, wherein the classification includes a weighted association of at least one keyword with the at least one image.

16. A computer-implemented method for searching a finite collection of images using at least one semantic network, comprising:
receiving, by a computer system having a processor, a query from an associated user, the query including a theme and at least one initial keyword;
identifying a set of keywords associated with the received theme and at least one initial keyword using at least one semantic network associated with the received theme and the at least one initial keyword;
searching the finite collection of images for images having metadata relating to the identified set of keywords;
determining if the images relating to the identified set of keywords from the finite collection of images exceeds a predetermined number of images;
determining, in response to a determination that the number of images relating to the identified set of keywords from the finite collection of images does not meet or exceed the predetermined number of images, that the finite collection of images includes additional images without metadata;
retrieving, in response to a determination that the finite collection of images includes additional images without metadata, a set of images from a remote data storage having metadata including at least one of the set of semantically linked keywords;

training a plurality of visual classifiers to learn a set of visual concepts corresponding to the set of keywords from the retrieved set of images;

selecting a set of trained visual classifiers for application to each image in the finite collection of images without metadata;

classifying each of a plurality of images of the finite collection of images without metadata in accordance with the selected set of trained visual classifiers;

searching the finite collection of images with the identified set of keywords, the finite collection of images including a plurality of images having metadata associated therewith and at least one classified image; and generating a result set of images from the finite collection of classified images in response to a search thereof with the set of keywords.

* * * * *